US012571349B2

(12) United States Patent
Unton

(10) Patent No.: US 12,571,349 B2
(45) Date of Patent: Mar. 10, 2026

(54) SHAFT COUPLE FOR RAPID START

(71) Applicant: Rolls-Royce Corporation, Indianapolis, IN (US)

(72) Inventor: Timothy Unton, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 0 days.

(21) Appl. No.: 17/873,884

(22) Filed: Jul. 26, 2022

(65) Prior Publication Data

US 2024/0035417 A1 Feb. 1, 2024

(51) Int. Cl.
| | |
|---|---|
| *F02C 7/275* | (2006.01) |
| *B64D 27/33* | (2024.01) |
| *B64D 31/18* | (2024.01) |
| *B64D 35/022* | (2025.01) |
| *F02C 7/268* | (2006.01) |
| *F02C 7/36* | (2006.01) |

(52) U.S. Cl.
CPC .............. *F02C 7/275* (2013.01); *B64D 27/33* (2024.01); *B64D 31/18* (2024.01); *B64D 35/022* (2024.01); *F02C 7/268* (2013.01); *F02C 7/36* (2013.01)

(58) Field of Classification Search
CPC .. F01D 15/10; F02C 7/275; F02C 7/36; F02C 7/268; F05D 2220/323; F05D 2260/4023; F05D 2260/4031; F05D 2260/42; F05D 2260/85; B64D 27/33; B64D 31/18; B64D 35/022; B64D 2013/0644; B64D 2013/0696
USPC ....................................................... 192/201
See application file for complete search history.

(56) References Cited

U.S. PATENT DOCUMENTS

| | | | | |
|---|---|---|---|---|
| 6,082,967 A | * | 7/2000 | Loisy | F02C 7/36 |
| | | | | 416/129 |
| 7,745,950 B2 | | 6/2010 | Lueck | |
| 8,516,789 B2 | * | 8/2013 | Kupratis | F02C 3/13 |
| | | | | 60/791 |
| 8,957,539 B1 | * | 2/2015 | Ralston | F01D 15/10 |
| | | | | 290/52 |
| 2005/0060983 A1 | * | 3/2005 | Lardellier | F02K 3/06 |
| | | | | 60/262 |
| 2010/0133832 A1 | * | 6/2010 | Butt | B64C 11/48 |
| | | | | 290/46 |

(Continued)

*Primary Examiner* — Devon C Kramer
*Assistant Examiner* — Henry Ng
(74) *Attorney, Agent, or Firm* — Barnes & Thornburg LLP

(57) ABSTRACT

A starter system for a gas turbine engine in, for example, a hybrid electric engine is provided. The hybrid electric engine may include the gas turbine engine, an electric machine, and an electrical energy storage. The starter system may include the electric machine, and a low-pressure shaft of the gas turbine engine may be mechanically coupled to a rotor of the electric machine. The electrical energy storage may electrically power the electrical machine and receive electrical power from the electrical machine. In addition, a clutch may selectively couple the low-pressure shaft to a high-pressure shaft of the gas turbine engine. The clutch may, when engaged, transfer mechanical power from the low-pressure shaft, which is mechanically coupled to the electric machine, to the high-pressure shaft. Further, the clutch may disengage if a rotational speed of the high-pressure shaft exceeds a rotational speed of the low-pressure shaft.

20 Claims, 5 Drawing Sheets

(56) References Cited

U.S. PATENT DOCUMENTS

| 2011/0056208 A1* | 3/2011 | Norris | F02C 7/36 |
| | | | 60/792 |
| 2013/0145769 A1* | 6/2013 | Norris | F02C 7/32 |
| | | | 60/722 |
| 2015/0330300 A1* | 11/2015 | Suciu | F02K 3/06 |
| | | | 416/169 R |
| 2015/0377125 A1* | 12/2015 | Kupratis | F02K 3/06 |
| | | | 60/774 |
| 2017/0370284 A1* | 12/2017 | Harvey | F01D 9/023 |
| 2018/0045119 A1* | 2/2018 | Sheridan | F02K 3/06 |
| 2018/0172012 A1* | 6/2018 | Plante | F01D 9/02 |
| 2018/0223740 A1* | 8/2018 | Forest | F02C 7/268 |
| 2019/0017443 A1* | 1/2019 | Eifert | F41H 13/0043 |
| 2019/0218977 A1* | 7/2019 | Muldoon | F02C 7/268 |
| 2020/0056546 A1* | 2/2020 | Terwilliger | B64D 27/10 |
| 2020/0158021 A1* | 5/2020 | Fontalbat | F02C 7/275 |
| 2020/0217248 A1* | 7/2020 | Julien | F02K 3/06 |
| 2020/0248632 A1* | 8/2020 | Leque | F02C 7/268 |
| 2021/0108569 A1* | 4/2021 | Devendorf | B32B 7/022 |
| 2021/0222628 A1* | 7/2021 | Devendorf | F02K 1/66 |
| 2021/0362859 A1* | 11/2021 | Willshee | F02C 7/275 |
| 2021/0388732 A1* | 12/2021 | Turcotte | B64D 31/18 |
| 2021/0388733 A1* | 12/2021 | Valois | F02C 3/145 |
| 2022/0074349 A1* | 3/2022 | Valois | F02C 3/10 |
| 2022/0136402 A1* | 5/2022 | Baladi | F02C 7/36 |
| | | | 60/805 |
| 2022/0297844 A1* | 9/2022 | Mackin | B64C 21/08 |
| 2023/0096526 A1* | 3/2023 | Valois | F01D 21/003 |
| | | | 415/122.1 |
| 2023/0399122 A1* | 12/2023 | Lemay | B64D 27/24 |

* cited by examiner

SHAFT COUPLE FOR RAPID START

TECHNICAL FIELD

This disclosure relates to a starter system and, in particular, a starter system for a gas turbine engine in a hybrid electric engine for a gas turbine engine or hybrid electric engine.

BACKGROUND

The size of electrical energy storage and thermal energy storage for a gas turbine engine in a hybrid electric engine that must be included to power a load, for example, the hybrid electric engine may be determined by the amount of time it takes to start the gas turbine engine. Previous solutions for reducing gas turbine engine start-times have included changing Full Authority Digital Engine Control (FADEC) limits, implementing a parallel-series battery configuration, and enlarging the starter motor. A combination of these approaches has reduced start-times by half. Further reductions in start-times are limited, however, and may require much larger components. In hybrid electric applications the main generator is typically connected to the power turbine output shaft which is not coupled to the gas generator shaft to enable higher efficiency at power offtakes below rated power. This generator may be coupled with high capacity batteries in a serial or hybrid architecture. Thus, the ideal solution to achieve further reduction in start times would utilize the existing high capacity battery and the large generator to reduce start times. Most engines of this type, however, are free-turbine type power turbines and, therefore, relying on the high capacity battery and large generator is not a viable means for starting as the large generator does not spin the compressor, or if the shaft of the large generator is connected to a low-pressure compressor, for example, the pressure ratio is insufficient for turbine starting. Consequently, present startup systems suffer from a variety of drawbacks, limitations, and disadvantages. Accordingly, there is a need for inventive systems, methods, components, and apparatuses described herein.

BRIEF DESCRIPTION OF THE DRAWINGS

The embodiments may be better understood with reference to the following drawings and descriptions. The components in the figures are not necessarily to scale. Moreover, in the figures, like-referenced numerals designate corresponding parts throughout the different views.

DETAILED DESCRIPTION

A starter system for a gas turbine engine in a hybrid electric engine is provided. The hybrid electric engine includes the gas turbine engine, an electric machine, and an electrical energy storage. The starter system includes the electric machine and may also include a low-pressure shaft of the gas turbine engine mechanically coupled to a rotor of the electric machine. The electrical energy storage is configured to electrically power the electrical machine and to receive electrical power from the electrical machine. The system also includes a clutch configured to selectively couple the low-pressure shaft to a high-pressure shaft of the gas turbine engine. The clutch is configured, when engaged, to transfer mechanical power from the low-pressure shaft, which is mechanically coupled to the electric machine, to the high-pressure shaft. This enables the electric machine to act as a starter motor. The clutch is further configured to disengage if a rotational speed of the high-pressure shaft exceeds a rotational speed of the low-pressure shaft. This enables the gas turbine engine to operate in a conventional manner after the gas turbine engine is started.

One interesting feature of the systems and methods described below may be that the starter system provided may significantly reduce the time it takes to start an engine. Alternatively, or in addition, an interesting feature of the systems and methods disclosed herein may be that the starter system may eliminate the need for a separate starter motor, start batteries, cabling, and/or starter control unit or microcontroller (MCU). Another interesting feature may be that the placement of the clutch may limit overspeed requirements to which low pressure turbine wheels must be designed. For example, the clutch may be placed on a turbine side of the shaft and, in the event of a low-pressure shaft break resulting from a low-pressure turbine spinning faster than the high-pressure turbine, the clutch may engage and slow the low-pressure turbine. The starter system may be applied to gas turbines where nominal power turbine shaft speed is at or below gas generator spool speeds during operation in gas turbine engines. In some examples, the starter system may remove potential undesired engagements during transients when the power turbine is unloaded.

Another interesting feature may be the potential for improved turbine life and durability. For example, to reduce start times or allow for smaller starter motors, a conventional start sequence may run at turbine temperature, which may result in decreased turbine durability.

Another interesting feature may be the potential to improve altitude re-light characteristics. The starter system may allow the motor to supplement wind-milling speed and as a result may improve pressure ratio and allow light-off at higher altitudes.

Figure 1:
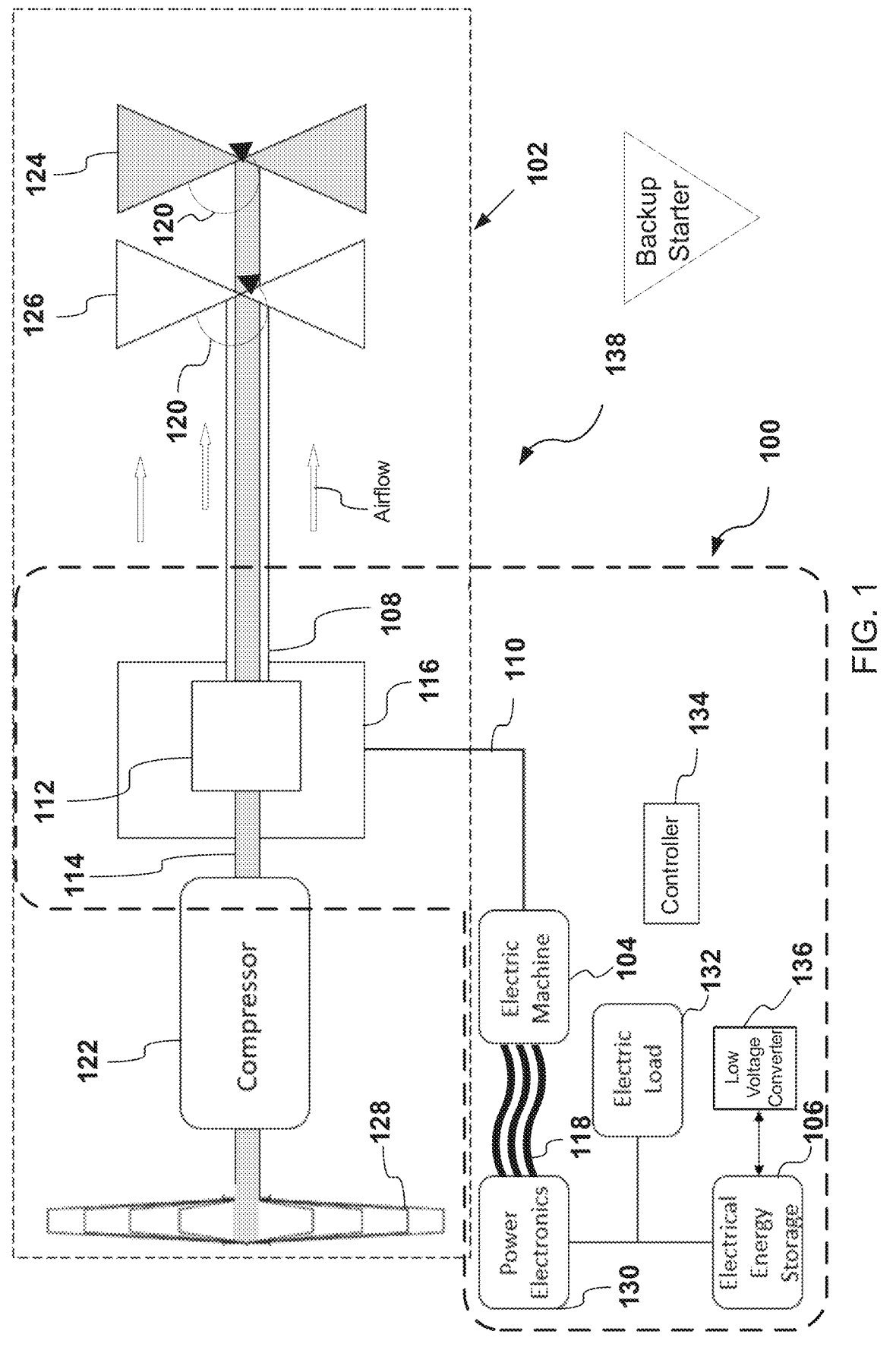
FIG. 1 is a block diagram schematic showing an example of a starter system for a gas turbine engine in a hybrid electric engine.

FIG. 1 is a block diagram schematic showing an example of a starter system 100 for a gas turbine engine 102 in a hybrid electric 138 engine. In some examples, the starter system 100 may apply to other applications where significant power generation is present on a low-pressure shaft 108. In addition, the gas turbine engine 102 may take a variety of forms in various embodiments. Though depicted as a two-spool engine in FIG. 1, in some forms, the gas turbine engine 102 may have one or three or more spools and/or may be any form of axial flow engine or mixed centrifugal/axial flow engine. Alternatively, or in addition, the gas turbine engine 102 may be a turboprop, a turbofan, or a turboshaft engine. Other variations are also contemplated.

The gas turbine engine 102 may include the starter system 100 for the gas turbine engine 102. FIG. 1 shows the starter system 100 for the gas turbine engine 102 in a hybrid electric 138 engine. The hybrid electric 138 engine may include the gas turbine engine 102, an electric machine 104, and an electrical energy storage 106. The starter system may include the electric machine 104 and may also include a low-pressure shaft 108 of the gas turbine engine 102 mechanically coupled to a rotor 110 of the electric machine 104. The electrical energy storage 106 may be configured to electrically power the electrical machine 104 and to receive electrical power from the electrical machine 104. The starter system 100 may also include a clutch 112 configured to selectively couple the low-pressure shaft 108 to a high-pressure shaft 114 of the gas turbine engine 102. The clutch 114 is configured, when engaged, to transfer mechanical power from the low-pressure shaft 108, which is mechanically coupled to the electric machine 104, to the high-pressure shaft 114. This enables the electric machine to act as a starter motor. In addition, the clutch 112 may be configured to disengage if a rotational speed 120 of the high-pressure shaft 114 exceeds a rotational speed 120 of the low-pressure shaft 108. This enables the gas turbine engine to operate in a conventional matter after the gas turbine engine is started.

As shown in FIG. 1, the gas turbine engine 102 may include a fan 128 and a compressor section 122. The gas turbine engine 102 may also include the high-pressure shaft 114 and the low-pressure shaft 108. The high-pressure shaft 114 may be, for example, mechanically coupled to a high-pressure turbine 124. Further, the low-pressure shaft 108 may be mechanically coupled to a low-pressure turbine 126. The low-pressure shaft 108 of the gas turbine engine 102 may, in turn, be mechanically coupled to a rotor 110 of the electric machine 104. Electrical power 118 may be supplied from the electrical energy storage 106 to the electric machine 104. Alternatively, or in addition, electrical power 118 from the electrical energy storage 106 may be supplied to power electronics 130 and/or any other electric load 132, such as hotel loads. In some examples, the low-pressure shaft 108 may be mechanically coupled to the electric machine 104. As a result, when the clutch 112 is engaged, mechanical power supplied to the low-pressure shaft 108 by the gas turbine engine 102 may be transferred from the low-pressure shaft 108 to the high-pressure shaft 114.

Figure 4:
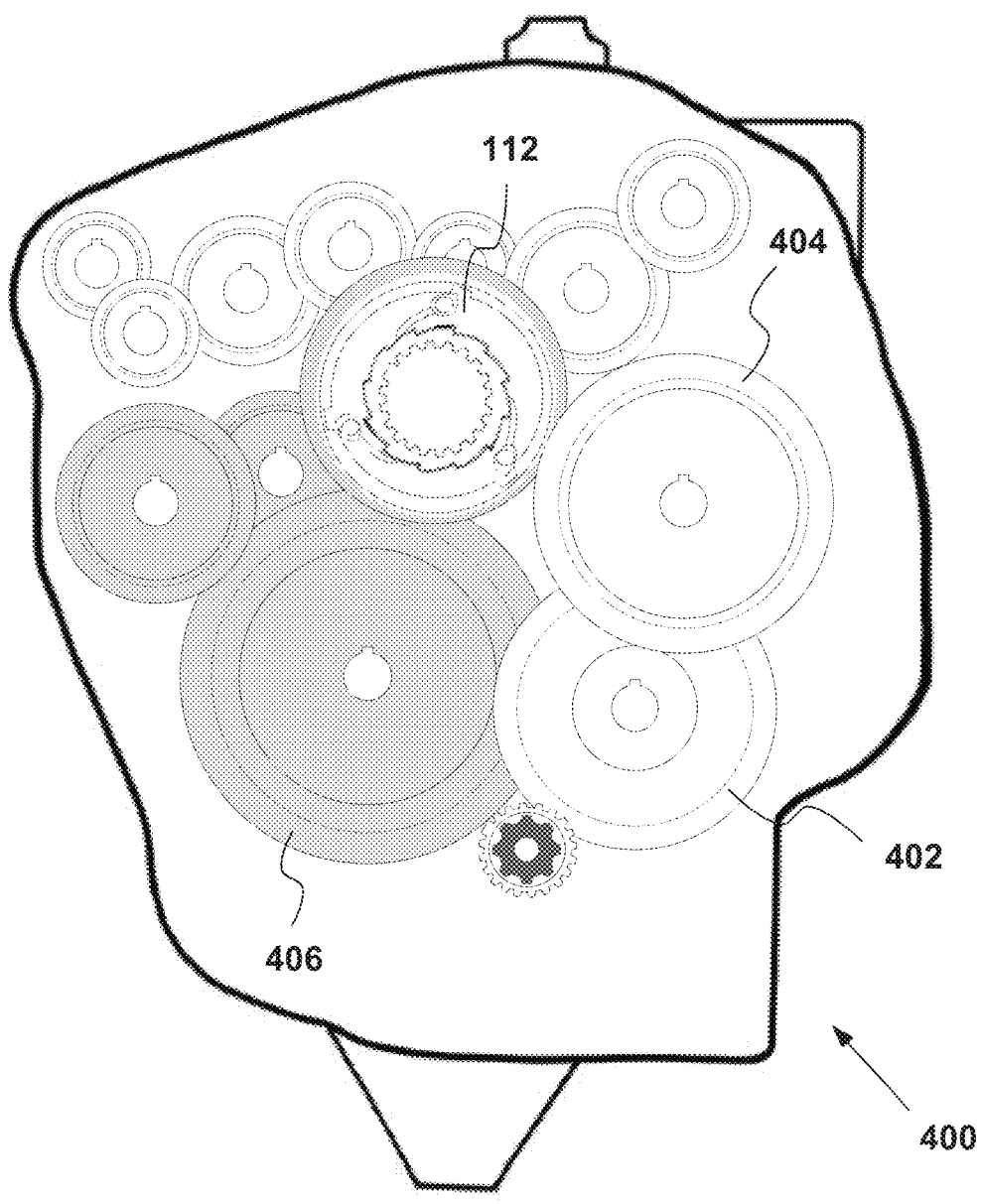
FIG. 4 is an example drive shaft housing for a gas turbine engine.

As shown in FIG. 1, the clutch 112 may be positioned, for example, in a gearbox 116. Further, the gearbox 116 may be positioned, for example, between the compressor 122 and the turbine section of the gas turbine engine 102. Alternatively, or in addition, the clutch 112 may be located in a drive shaft housing 400 (as shown in FIG. 4). In some examples, the clutch 112 may be mechanically configured to automatically disengage when the rotational speed 120 of the high-pressure shaft 114 exceeds the rotational speed 120 of the low-pressure shaft 108.

In some examples, the starter system 100 may eliminate the need for a discrete starter motor and/or start batteries. The resulting absence of the discrete starter motor and/or start batteries may remove a source of low-voltage system power. As such, low-voltage power required by some systems prior to or during start-up that might conventionally have been powered by the discrete start batteries may need to be powered by the electrical energy storage 106. Still referring to FIG. 1, a low-voltage converter 136, for example, a DC/DC converter may be electrically coupled to the electrical energy storage 106. As noted above, the electrical energy storage 106 may supply low-voltage power via the DC/DC converter 136. The low-voltage power may be used prior to start-up and/or during operations. Alternatively, a discrete backup starter motor (not shown) and/or start batteries (not shown) may be provided as a backup starter in case, for example, the starter system 100 fails. In some examples, the starter system 100 may be implemented as a redundant, backup starter. In some examples, the starter system 100 may be activated and/or controlled via a controller 134.

Figure 2:
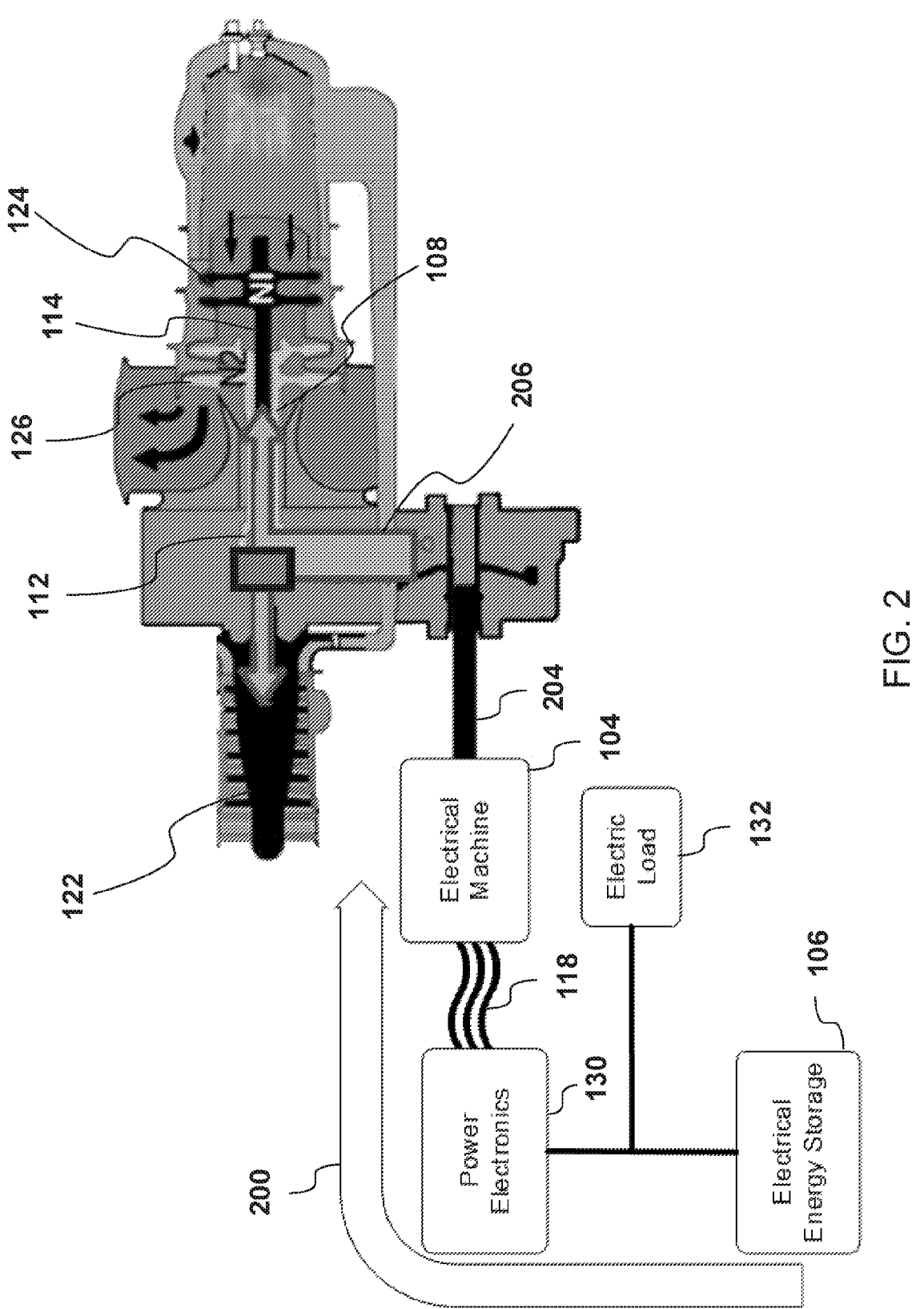
FIG. 2 is an example functional flow diagram showing the flow of energy while a clutch is engaged during a start sequence for a gas turbine engine of an electric hybrid engine.

FIG. 2 is an example functional flow diagram illustrating the flow of energy 200 while the clutch 112 is engaged during a start sequence for an electric hybrid engine 138. FIG. 2 illustrates the flow of energy 200 that may flow from the electrical energy storage 106 to the electric machine 104. Mechanical power may be transferred, for example, from the electric machine 104 through a shaft 204 of the electric machine 104 to the low-pressure shaft 108. In the illustrated example, the electric machine 104 may act as a motor during the start sequence. As previously mentioned, while the clutch 112 is engaged, the clutch 112 may couple the low-pressure shaft 108 to the high-pressure shaft 114. As a result, mechanical power may be transferred from the low-pressure shaft 108 to the high-pressure shaft 114. The mechanical power transferred to the high-pressure shaft 114 may cause the high-pressure turbine 124 to rotate.

In some examples, the clutch 112 may be an active clutch, and when the clutch 112 is engaged during the start sequence, torque 206 may flow bi-directionally. For example, the torque 206 transferred from the low-pressure shaft 108 from the rotor 110 may be transferred to the output shaft 210 and high-pressure shaft 114 which, in turn, may transfer the torque 206 to the compressor 122 section and the fan 128 (FIG. 1). In some examples, the clutch 112 may be a freewheeling clutch which may transfer torque 206 in only one direction. For example, when the freewheeling clutch 112 is engaged, torque 206 may be transferred only to high-pressure shaft 114.

As previously noted, either during the start sequence or after the start sequence, the high-pressure shaft 114 may reach a rotational speed 120 exceeding the rotational speed 120 of the low-pressure shaft 108, at which point the clutch 112 may automatically disengage. This will then allow the gas turbine engine 102 to deliver shaft horsepower to the electric machine 104, which will start acting as a generator.

Figure 3:
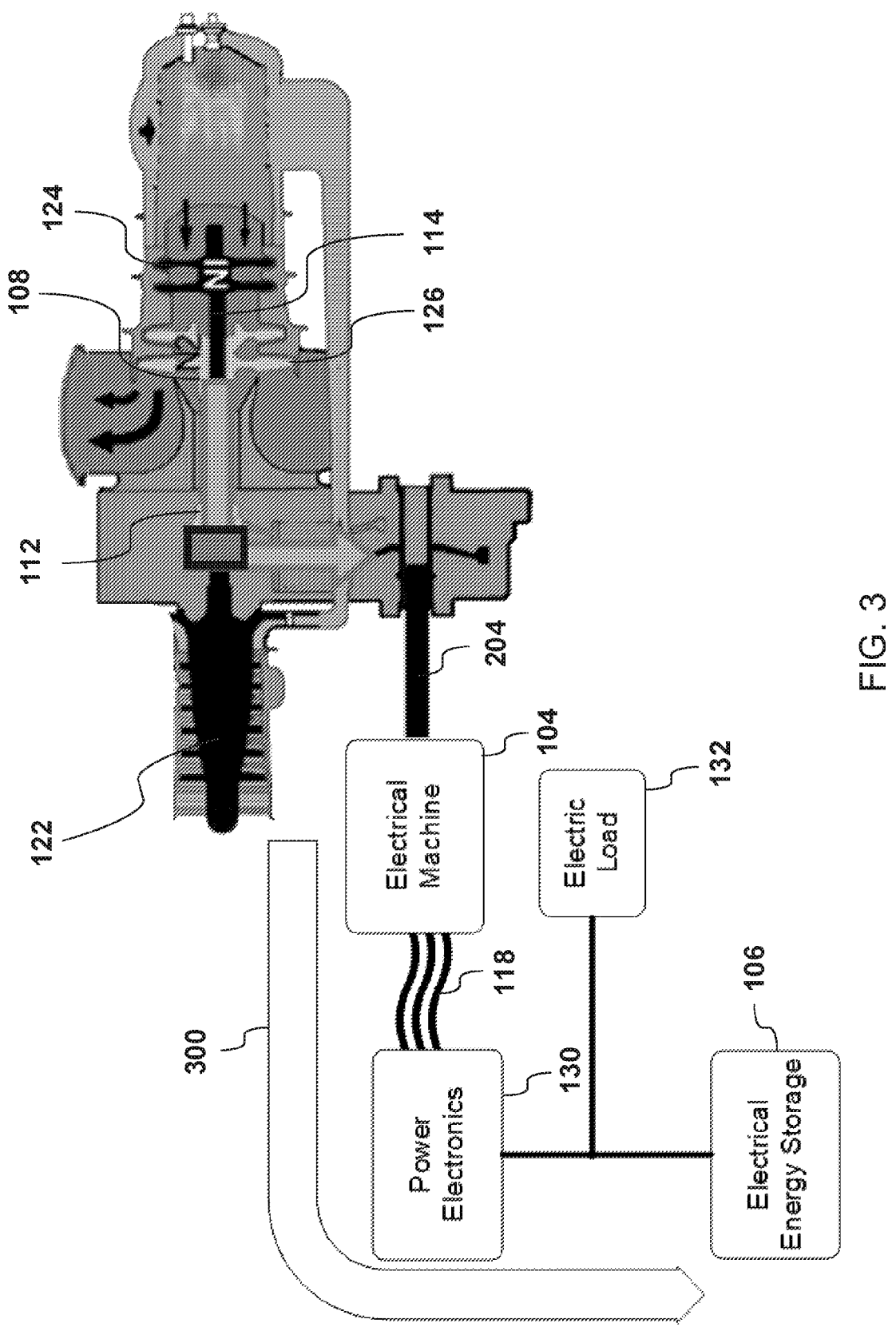
FIG. 3 is an example functional flow diagram showing the flow of energy and generation of power in a gas turbine engine of an electric hybrid engine while a clutch is disengaged.

FIG. 3 is an example functional flow diagram showing the flow of electrical energy 300 in the hybrid electric engine 138 while the clutch 112 is disengaged during a generating period. As previously discussed, if the rotational speed 120 of the high-pressure shaft 114 exceeds the rotational speed 120 of the low-pressure shaft 108, the clutch 112 may automatically disengage, such as if the clutch 112 is a freewheeling clutch. Alternatively, or in addition, the clutch 112 may be commanded to disengage. When the clutch 112 is disengaged, the engine 102 acts as a gas generator and power is received by the low-pressure turbine 126 and subsequently transferred to the electric machine 104. The electrical energy 118 generated by the electric machine 104 may be stored for future use in the electrical energy storage 106. Alternatively, or in addition, the electrical energy 118 generated by the electric machine 104 may be used to supply loads.

FIG. 4 is an example gearbox 400 for a gas turbine engine 102. In the illustrated example, the clutch 112 is a freewheeling clutch included within the gearbox 400. In some embodiments, the gearbox 400 may include one or more gears 402 that may be connected to the high-pressure shaft 114 and/or the low-pressure shaft 108. The clutch 112 may be installed between the gears and gear teeth may thereby transfer torque 206 to the high-pressure shaft 114 and/or the low-pressure shaft 108. Thus, there may be additional room for installation of the clutch 112. Further, relative gear ratios may tune the speed at which the high-pressure shaft 114 and the low-pressure shaft 108 connect and/or disconnect. For example, the clutch 112 may be installed between the high-pressure shaft 114 and low-pressure shaft 108, wherein the high-pressure shaft 114 may normally operate at 50,000 rpm and the low-pressure shaft 108 may operate at 20,000 rpm. In this example, torque 206 transfer may continue up to 20,000 rpm and be limited by speed rating of the low-pressure turbine 126. On the other hand, in some embodiments, the gearbox may include a high-pressure gear 404 that connects to the high-pressure shaft 114, and spins at the same speed as the high-pressure shaft 114. Further, a low-pressure gear 406 within the gearbox 400 may be connected to the low-pressure shaft 108 and may spin faster than the low-pressure shaft 108 by a gear ratio of, for example, 2-to-1. If the clutch 112 is installed in between the high-pressure gear 404 and the low-pressure gear 406, the clutch 112 may remain engaged up to 40,000 rpm of the high-pressure shaft 114, and may result in a faster start time. Alternatively, or in addition, a gear within the gearbox may engage with the low-pressure shaft 108 and the high-pressure shaft 114 such that the gear flips the direction of low-pressure shaft 108 or high-pressure shaft 114 rotation.

Figure 5:
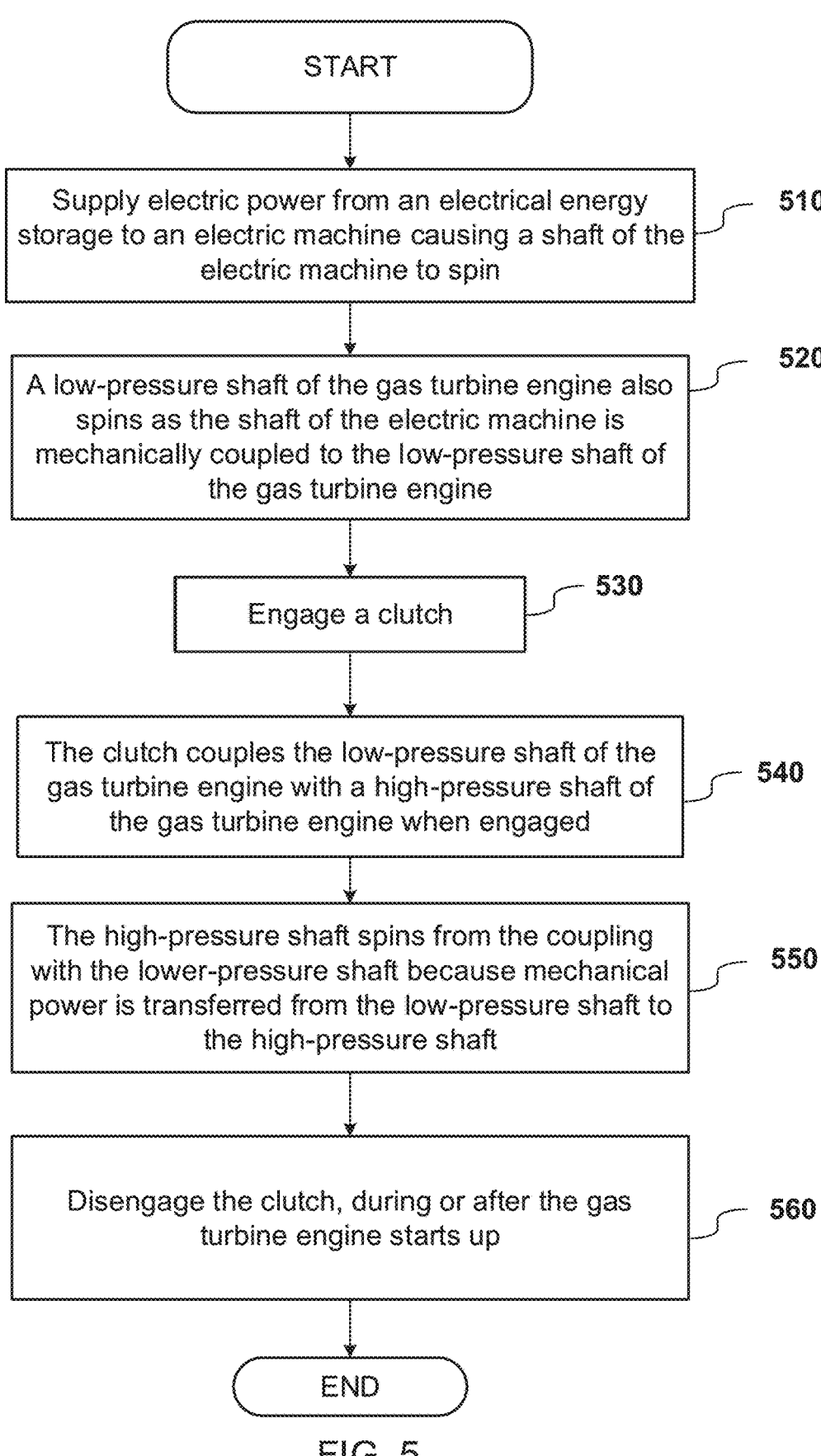
FIG. 5 is an example operational flow diagram for a start sequence in a gas turbine engine.

FIG. 5 is an example operational flow diagram for a start sequence 200 in a gas turbine engine 102. The start sequence 200 may include additional, fewer, and/or different operations than illustrated in FIG. 5.

The example in FIG. 5 illustrates a method of starting the gas turbine engine 102 in the hybrid electric engine 138. The method comprises supplying electric power from an electrical energy storage 106 to an electric machine 104 causing a shaft of the electric machine 104 to spin (510). A low-pressure shaft 108 of the gas turbine engine 102 may also spin as the shaft of the electric machine 104 may be mechanically coupled to the low-pressure shaft 108 of the gas turbine engine 102 (520). The clutch 112 may engage (530), wherein the clutch 112 may be configured to couple the low-pressure shaft 108 of the gas turbine engine 102 with the high-pressure shaft 114 of the gas turbine engine 102 when engaged (540). The high-pressure shaft 114 may spin from the coupling with the low-pressure shaft 108 because mechanical power may be transferred from the low-pressure shaft 108 to the high-pressure shaft 114 (550). The clutch 112 may disengage, during or after the gas turbine engine 102 starts up, as a rotational speed 120 of the high-pressure shaft 114 exceeds the rotational speed 120 of the low-pressure shaft 108 (560).

Alternatively, or in addition, fuel may be introduced to the gas turbine engine 102 once pressure ratio is sufficient to sustain combustion in a combustor, thus fuel and ignitors may assist turbine startup. Further, combustion may assist turbine startup after light-off, while the clutch 112 may still be engaged and the torque 206 may continue to be transferred from the low-pressure shaft 108 to the high-pressure shaft 114. Disengaging the clutch 112 from the high-pressure shaft 114 may occur automatically when the rotational speed 120 of the high-pressure shaft 114 is higher than the rotational speed 120 of the low-pressure shaft 108. When the clutch 112 is disengaged, power may be drawn from the electric machine 104 which may result in the electric machine 104 acting as a generator. Operations may end, for example, by the electric machine 104 operating as a generator.

In some examples, the start sequence 200 may include an engaged free-wheel clutch 112 positioned between the low-pressure shaft 108 and the high-pressure shaft 114 and the engaged clutch may transfer torque between the low-pressure shaft 108 and the high-pressure shaft 114 which may then cause the high-pressure shaft 114 to spin. In other examples, an active clutch 112 may engage the low-pressure shaft 108 and the high-pressure shaft 114. If the clutch 112 is an active clutch 112, speeds of the low-pressure shaft 108 and the high-pressure shaft 114 may remain the same while engaged. Consequently, there may need to be a determination that the gas turbine engine 102 is producing enough power to be self-sustaining if the clutch were to be disengaged. The determination that the high-pressure shaft 114 would be self-sustaining if the clutch were disengaged may be made in a variety of ways. In some examples, the active clutch 112 may disengage in response to a determination that revolutions-per-minute (rpm) exceeds a predetermined threshold, for example 20,000 rpm. In another example, the clutch 112 may disengage in response to a predetermined period of time following light-off of the gas turbine engine 102, for example 3 seconds after light-off is detected. Alternatively, or in addition, the active clutch 112 may disengage in response to a predetermined amount of fuel-flow to the gas turbine engine 102. The predetermined amount of fuel-flow may vary greatly amongst engine types and sizes. For example, the active clutch 112 may disengage when the amount of fuel-flow exceeds 80% idle fuel flow. Where fuel flow may be measured in kilograms per second (kg/s). Alternatively, or in addition, the active clutch 112 may disengage when the amount of fuel-flow exceeds 10% of max fuel flow (kg/s).

In still other examples, the active clutch 112 may disengage in response to a predetermined change in machine revolutions-per-minute (rpm) of the gas turbine engine 102 in relation to a flow of current to the electric machine 104. For example, once the gas turbine engine 102 starts driving, the electric machine 104 may require less electric current to maintain the same rpm. Therefore, a predetermined drop, for example, a 10% drop in electric current required from the electric machine 104 may cause the active clutch 112 to disengage.

To clarify the use of and to hereby provide notice to the public, the phrases "at least one of <A>, <B>, . . . and <N>" or "at least one of <A>, <B>, . . . or <N>" or "at least one of <A>, <B>, <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed. Unless otherwise indicated or the context suggests otherwise, as used herein, "a" or "an" means "at least one" or "one or more."

While various embodiments have been described, it will be apparent to those of ordinary skill in the art that many more embodiments and implementations are possible. Accordingly, the embodiments described herein are examples, not the only possible embodiments and implementations.

The subject-matter of the disclosure may also relate, among others, to the following aspects:

A first aspect relates to a starter system for a for a gas turbine engine in a hybrid electric engine, the hybrid electric engine comprising the gas turbine engine, an electric machine, and an electrical energy storage, the starter system comprising: the electric machine, wherein a low-pressure shaft of the gas turbine engine is mechanically coupled to a rotor of the electric machine; the electrical energy storage configured to electrically power the electrical machine and to receive electrical power from the electrical machine; a clutch configured to selectively couple the low-pressure shaft to a high-pressure shaft of the gas turbine engine, wherein the clutch is configured, when engaged, to transfer mechanical power from the low-pressure shaft, which is mechanically coupled to the electric machine, to the high-pressure shaft, wherein the clutch is configured to disengage if a rotational speed of the high-pressure shaft exceeds a rotational speed of the low-pressure shaft.

A second aspect relates to the starter system of aspect 1, wherein the clutch is a freewheeling clutch.

A third aspect relates to the starter system of aspect 1, wherein the clutch is an active clutch, and the mechanical power is transferred from the low-pressure shaft to the high-pressure shaft.

A fourth aspect relates to the starter system of any preceding aspect, wherein the gas turbine engine is a multi-spool gas turbine engine.

A fifth aspect relates to the starter system of any preceding aspect, wherein the clutch is disposed in a gearbox.

A sixth aspect relates to the starter system of aspect 1 further comprising a second electric starter for the gas turbine engine.

A seventh aspect relates to a starter system of any preceding aspect, wherein the gas turbine engine is a turboshaft engine.

An eighth aspect relates to a starter system for a hybrid-electric engine, the hybrid electric engine comprising a gas turbine engine, an electric machine, and an electrical energy storage, the starter system comprising: the electric machine mechanically coupled to a rotor, wherein the electric machine is configured to act as a conduit to transfer electrical power between an electrical storage and the rotor; a low-pressure shaft coupled to the rotor and a high-pressure shaft, wherein the low-pressure shaft is configured to act as a conduit to transfer mechanical power between the rotor and the high-pressure shaft; and a clutch configured to selectively couple the low-pressure shaft and the high-pressure shaft such that when the clutch is engaged electrical power is transferred from the electrical storage to the electric machine, wherein the electrical power from the electric machine is transferred to the rotor and causes mechanical power to be transferred to the low-pressure shaft and to the high-pressure shaft resulting in rotation of the high-pressure shaft; and wherein the clutch is configured to decouple the high-pressure shaft and the low-pressure-shaft when a rotational speed of the high-pressure shaft exceeds a rotational speed of the low-pressure shaft.

A ninth aspect relates to the starter system of any preceding aspect, wherein the electric machine is a generator when the clutch is disengaged.

A tenth aspect relates to the starter system of any preceding aspect, wherein the free-turbine type power engine is part of a hybrid electric aircraft.

An eleventh aspect relates to the starter system of any preceding aspect, wherein the clutch is disposed in a compressor section of the engine.

A twelfth aspect relates to the starter system of any preceding aspect, wherein a fuel is used for combustion to assist turbine startup.

A thirteenth aspect relates to a method of starting a gas turbine engine in a hybrid engine, the method comprising: supplying electric power from an electrical energy storage to an electric machine causing a shaft of the electric machine to spin, wherein a low-pressure shaft of the gas turbine engine also spins because the shaft of the electric machine is mechanically coupled to the low-pressure shaft of the gas turbine engine; engaging a clutch, wherein the clutch is configured to couple the low-pressure shaft of the gas turbine engine with a high-pressure shaft of the gas turbine engine when engaged, and wherein the high-pressure shaft spins from the coupling with the lower-pressure shaft because mechanical power is transferred from the low-pressure shaft to the high-pressure shaft; disengaging the clutch, during or after the gas turbine engine starts up, as a rotational speed of the high-pressure shaft exceeds the rotational speed of the low-pressure shaft.

A fourteenth aspect relates to the method of aspect 13, further comprising powering the electric machine by transferring mechanical power from the low-pressure shaft to the shaft of the electric machine after the clutch is disengaged.

A fifteenth aspect relates to the method of aspect 13, wherein the clutch is a freewheeling clutch.

A sixteenth aspect relates to the method of aspect 13, wherein the clutch is an active clutch.

A seventeenth aspect relates to the method of any preceding aspect, further comprising disengaging an active clutch in response to a determination that revolutions-per-minute (rpm) exceeds a predetermined threshold.

An eighteenth aspect relates to the method of any preceding aspect, further comprising disengaging an active clutch in response to a predetermined period of time following light-off of the gas turbine engine.

A nineteenth aspect relates to the method of any preceding aspect, further comprising disengaging an active clutch in response to a predetermined amount of fuel-flow to the gas turbine engine.

A twentieth aspect relates to the method of any preceding aspect, further comprising disengaging an active clutch in response to a predetermined change in machine revolutions-per-minute (rpm) of the gas turbine engine in relation to a supply of electric power flowing to the electric machine.

In addition to the features mentioned in each of the independent aspects enumerated above, some examples may show, alone or in combination, the optional features mentioned in the dependent aspects and/or as disclosed in the description above and shown in the figures.

What is claimed is:

1. A starter system for a gas turbine engine in a hybrid electric engine, the hybrid electric engine comprising the gas turbine engine, an electric machine, and an electrical energy storage, the starter system comprising:

the electric machine, wherein a low-pressure shaft of the gas turbine engine is mechanically coupled to a rotor of the electric machine;

the electrical energy storage configured to electrically power the electric machine and to receive electrical power from the electric machine;

a clutch configured to selectively couple the low-pressure shaft to a high-pressure shaft of the gas turbine engine, the high-pressure shaft connecting a high-pressure turbine with a fan and a compressor section of the gas turbine engine, wherein the clutch is configurable in an engaged state and a disengaged state, wherein, in the engaged state, the clutch transfers mechanical power from the rotor of the electric machine to the high-pressure shaft through the low-pressure shaft and wherein, in the disengaged state, the clutch transfers power from a low-pressure turbine of the gas turbine engine to at least one of the electric machine and the electrical energy storage, wherein the clutch is a freewheeling clutch in which a rotational speed of the high-pressure shaft exceeding a rotational speed of the low-pressure shaft causes the clutch to disengage in order to transfer power from the low-pressure turbine to at least one of the electric machine and the electrical energy storage, wherein, in response to the clutch being in the disengaged state, the high-pressure turbine of the gas turbine engine drives the fan and the compressor section of the gas turbine engine via the high-pressure shaft.

2. The starter system of claim 1, wherein the gas turbine engine is a multi-spool gas turbine engine.

3. The starter system of claim 1, wherein the clutch is disposed in a gearbox.

4. The starter system of claim 1, further comprising a backup starter for the gas turbine engine.

5. The starter system of claim 1, wherein the gas turbine engine is a turboshaft engine.

6. The starter system of claim 1, further comprising a gearbox positioned on the low-pressure shaft and the high-pressure shaft and positioned axially between the compressor section and a turbine section of the gas turbine engine, and wherein the clutch is positioned in the gearbox between the high-pressure shaft and the low-pressure shaft to selectively couple the low-pressure shaft to the high-pressure shaft.

7. The starter system of claim 1, wherein the low-pressure shaft extends between and interconnects a gearbox and a turbine section of the gas turbine engine and the high-pressure shaft extends between and interconnects the compressor section and the turbine section, the gearbox located axially between the compressor section and the turbine section, and wherein the clutch is arranged on the low-pressure shaft and the high-pressure shaft axially between the compressor section and the turbine section.

8. The starter system of claim 1, wherein the low-pressure shaft extends between and interconnects a gearbox and a turbine section of the gas turbine engine and the high-pressure shaft extends between and interconnects the compressor section and the turbine section, and wherein the starter system further comprises the gearbox arranged on the low-pressure shaft and the high-pressure shaft axially between the compressor section and the turbine section, and wherein the clutch is positioned in the gearbox on the low-pressure shaft and the high-pressure shaft such that the clutch is radially aligned with the low-pressure shaft and the high-pressure shaft.

9. The starter system of claim 1, wherein the high-pressure shaft extends between and interconnects the compressor section and a turbine section, and wherein the clutch is arranged around the low-pressure shaft and the high-pressure shaft to rotate therewith.

10. The starter system of claim 9, wherein the low-pressure shaft and the high-pressure shaft are both configured to rotate about a central axis, and wherein the clutch is positioned on the central axis to rotate with the low-pressure shaft and the high-pressure shaft.

11. A starter system for a hybrid-electric engine, the hybrid-electric engine comprising a gas turbine engine, an electric machine, and an electrical energy storage, the starter system comprising:

the electric machine mechanically coupled to a rotor, wherein the electric machine is configured to act as a conduit to transfer electrical power between the electrical energy storage and the rotor;

a low-pressure shaft coupled to the rotor and a high-pressure shaft, wherein the low-pressure shaft is configured to act as a conduit to transfer mechanical power between the rotor and the high-pressure shaft; and a clutch configured to selectively couple the low-pressure shaft and the high-pressure shaft, wherein the clutch is configurable in an engaged state and a disengaged state, wherein, in the engaged state, the electrical energy storage transfers electrical power to the electric machine and the electric machine transfers the electrical power to the rotor causing the low-pressure shaft to transfer mechanical power to the high-pressure shaft and wherein, in the disengaged state, the clutch transfers power from a low-pressure turbine to at least one of the electric machine and the electrical energy storage; and wherein the clutch is a freewheeling clutch in which a rotational speed of the high-pressure shaft exceeding a rotational speed of the low-pressure shaft causes the clutch to disengage, wherein the high-pressure shaft extends entirely between a fan and a high-pressure turbine of the gas turbine engine to drive the fan via the high-pressure turbine, and wherein the low-pressure shaft only extends between the clutch and the low-pressure turbine of the gas turbine engine.

12. The starter system of claim 11, wherein the electric machine is a generator when the clutch is in the disengaged state.

13. The starter system of claim 11, wherein the clutch is disposed in a compressor section of the gas turbine engine.

14. The starter system of claim 11, wherein a fuel is used for combustion to assist turbine startup.

15. The starter system of claim 11, wherein the clutch is arranged on the low-pressure shaft and the high-pressure shaft, the high-pressure shaft extends axially between and interconnects the fan and the high-pressure turbine of the gas turbine engine, and the low-pressure shaft extends axially between the clutch and the low-pressure turbine.

16. The starter system of claim 11, wherein the rotational speed of the high-pressure shaft that causes the clutch to disengage is a predetermined rotational speed.

17. A method of starting a gas turbine engine in a hybrid engine, the method comprising:

supplying electric power from an electrical energy storage to an electric machine, rotating a shaft of the electric machine, wherein the shaft of the electric machine is mechanically coupled to a low-pressure shaft of the gas turbine engine;

engaging a clutch arranged between the low-pressure shaft and a high-pressure shaft of the gas turbine engine, wherein the clutch is configured to couple the low-pressure shaft of the gas turbine engine with the high-pressure shaft of the gas turbine engine, and wherein the clutch is a freewheeling clutch, transferring mechanical power from the shaft of the electric machine to the high-pressure shaft through the low-pressure shaft, rotating the high-pressure shaft at a rotational speed greater than a rotational speed of the low-pressure shaft, disengaging the clutch after the rotational speed of the high-pressure shaft exceeds the rotational speed of the low-pressure shaft, transferring power from a low-pressure turbine of the gas turbine engine to at least one of the electric machine and the electrical energy storage after the clutch is disengaged, and driving a fan of the gas turbine engine with a high-pressure turbine of the gas turbine engine via the high-pressure shaft after the clutch is disengaged.

18. The method of claim 17, further comprising powering the electric machine by transferring mechanical power from the low-pressure shaft to the shaft of the electric machine after the step of disengaging the clutch.

19. The method of claim 17, wherein the step of engaging a clutch includes automatically engaging the clutch with the high-pressure shaft, and wherein the step of disengaging the clutch includes automatically disengaging the clutch from the high-pressure shaft.

20. The method of claim 17, further comprising arranging the low-pressure shaft and the high-pressure shaft about a central axis and positioning the clutch on the central axis, wherein the low-pressure shaft extends circumferentially around the high-pressure shaft.

\* \* \* \* \*